A. J. CULBERTSON.
Fire-Escape
No. 165,714. Patented July 20, 1875.
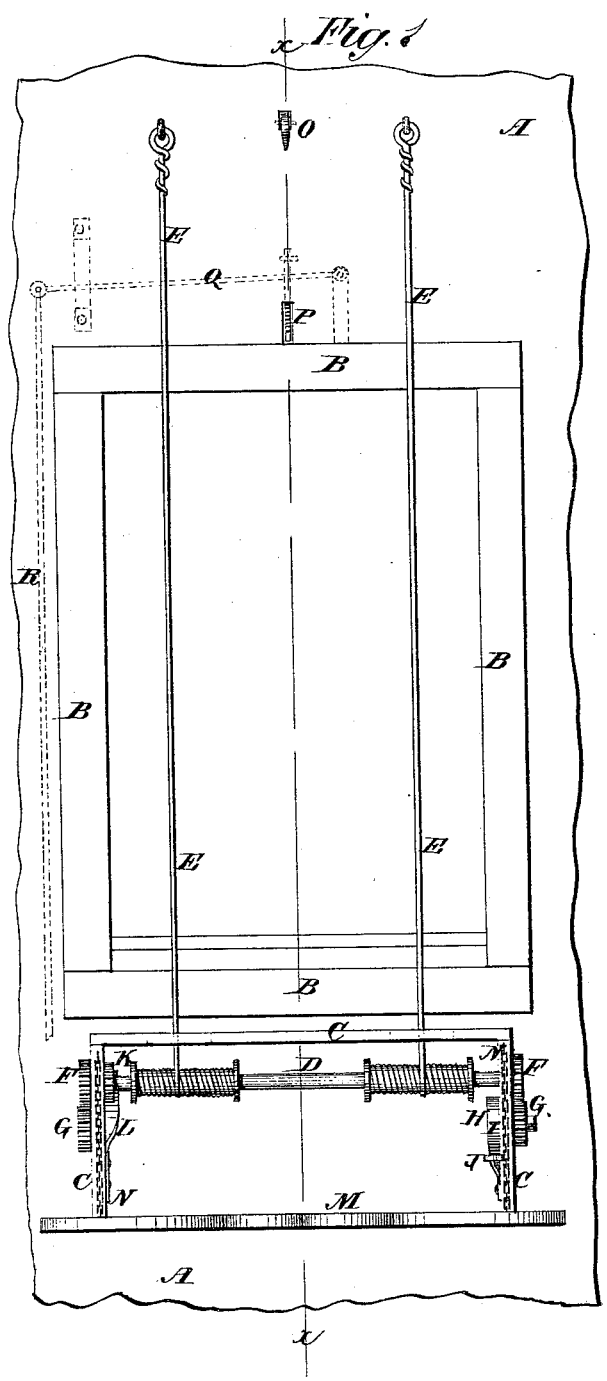
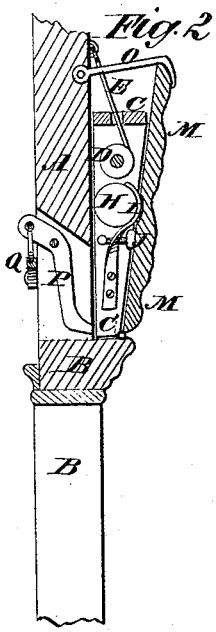
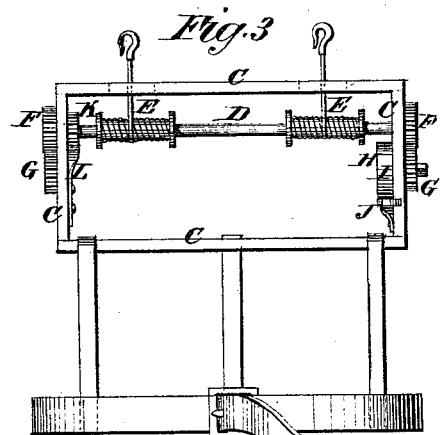
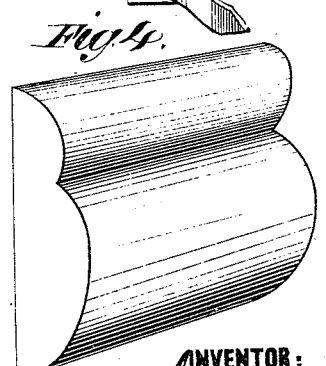
WITNESSES:
Francis McArdle.
A. F. Terry
INVENTOR:
A. J. Culbertson
BY Munn
ATTORNEYS.

UNITED STATES PATENT OFFICE.

ANDREW J. CULBERTSON, OF SAN ANDREAS, CALIFORNIA.

IMPROVEMENT IN FIRE-ESCAPES.

Specification forming part of Letters Patent No. 165,714, dated July 20, 1875; application filed June 5, 1875.

*To all whom it may concern:*

Be it known that I, ANDREW J. CULBERTSON, of San Andreas, in the county of Calaveras and State of California, have invented a new and useful Improvement in Fire-Escapes, of which the following is a specification:

Figure 1 is a front view of my improved fire-escape, shown as partly lowered. Fig. 2 is a vertical section of the same, taken through the line $x\ x$, Fig. 1, and shown as secured above a window. Fig. 3 is a front view of a modified form of the same. Fig. 4 is a rear view of the same closed.

Similar letters of reference indicate corresponding parts.

The object of this invention is to furnish an improved fire-escape, which shall be so constructed as to enable a person to lower himself to the ground from a window quickly, easily, and safely, however high the window may be from the ground.

The invention consists in an improved fire-escape formed by the combination, with each other, of the frame, the reel, the wires, the gear-wheels, the friction-wheel, the brake and hand-screw, and the ratchet-wheel and pawl, and whether a platform or strap be connected with said frame, and in the combination of the bent lever, and the lever and cord, with the device for pushing it from its seat above a window, as hereinafter fully described.

A represents the wall of a house, and B represents a window-frame. C is a small, light, and strong frame, to the upper part of the side bars of which is pivoted a reel, D. To the reel D are attached the ends of two wires, E, which are wound upon the said reel, and the other ends of which pass through holes or short slots in the top bar of the frame C, and have eyes or hooks formed upon or attached to them, so that they may be attached to hooks, eyebolts, or staples driven into or secured to the wall A or the window-frame B, or may be hooked upon the sill of the window-frame or other support. To the ends of the reel-shaft D, upon the outer sides of the side bars of the frame C, are attached two gear-wheels, F, the teeth of which mesh into the teeth of two gear-wheels, G, pivoted to the said side bars of the frame C below the reel D. The outer end of the hub of one or both the wheels, G, is squared off to receive a key for turning the reel D to wind up the wires E. To the other end of the hub of the wheel G, upon the inner side of the side bar of the frame C, is attached a friction-wheel, H, upon the face of which rests the brake I. The lower end of the brake I is pivoted to the side bar of the frame C, and through the middle part of said brake is formed a hole for the passage of the hand-screw J, which screws into a nut attached to the side bar of the frame C, so that by turning the hand-screw J out and in the force with which the brake I is applied to the wheel H may be regulated at will. To the reel-shaft D, near one of the side bars of the frame C, is attached a ratchet-wheel, K, with the teeth of which engages the pawl L, attached to the side bar of the said frame C, so as to hold the reel D from revolving when desired. To the lower part of the frame C is hinged the edge of a platform, M, which may be turned up to serve as a cover for the frame C and its attachments, as shown in Fig. 2, or turned down to serve as a platform for those using the escape. The platform M is supported, when turned down, by two chains, N, the lower ends of which are attached to the platform M near its outer edge, and their upper ends are attached to the upper part of the frame C. The device is secured in place above the window by a hook, O, attached to the wall A, and which catches upon the upper edge of the platform M, as shown in Fig. 2.

When the machine is made small the platform M may be replaced by a strap to be buckled around the waist of the person who uses the device, and which is connected with the frame C by three or more short straps. In this case the inner side of the frame C should be inclosed by an ornamental casing, so that the device may be hung against the wall, and may have an ornamental appearance, the straps being placed within it.

P is a bent lever, which passes in through and is pivoted to the wall A, and with the inner end of which is connected the end of a lever, Q. The lever Q is pivoted to the inner side of the wall A, and with its free end is connected a cord, R, that hangs along the wall, so that its lower end may be reached and operated by a person standing upon the floor of the room.

By this construction, by pulling upon the cord R, the lever P will be operated to push the device from its seat above the window and allow it to drop down to the window-sill, where it will be stopped by the ratchet-wheel and pawl K L, and held until the person or persons to descend have taken their places upon the platform M. The pawl L is then turned back from the ratchet-wheel K and the device is allowed to descend, the rapidity of descent being regulated and controlled by the brake I and hand-screw J.

Having thus described my invention, I claim as new and desire to secure by Letters Patent—

1. An improved fire-escape formed by the combination of the frame C, reel D, wires E, gear-wheels F G, friction-wheel H, brake and hand-screw I J, and ratchet-wheel and pawl K L, and a platform or strap connected with said frame, substantially as herein shown and described.

2. The combination, with the device C M, of the bent lever P and the lever and cord Q R, for pushing it from its seat above a window, substantially as herein shown and described.

ANDREW JACKSON CULBERTSON.

Witnesses:
   H. G. ALLEN,
   A. BADER.